Aug. 12, 1969  T. WILHARM  3,460,889
MOTION PICTURE PROJECTOR
Filed Aug. 3, 1966  5 Sheets-Sheet 5
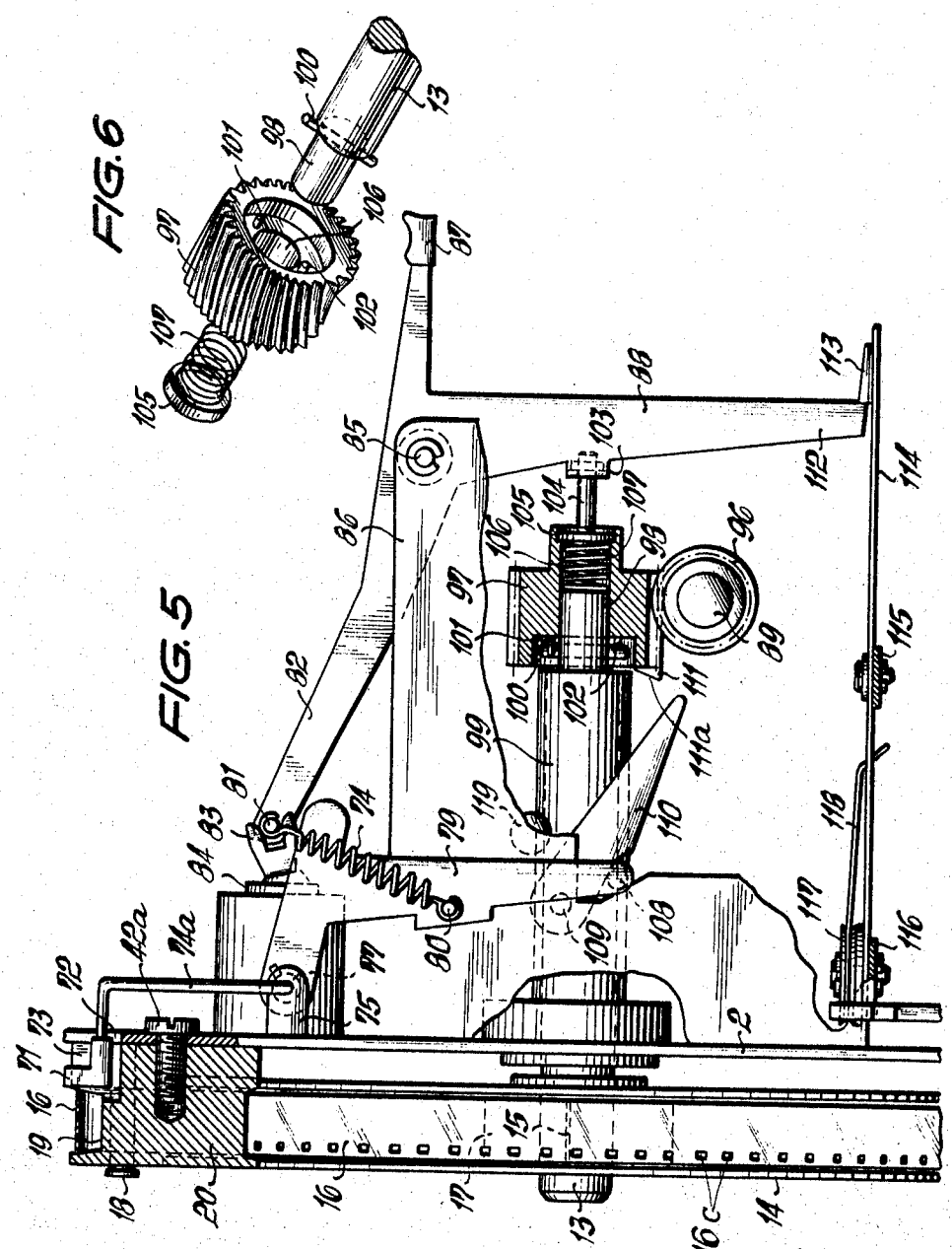
INVENTOR:
THEO WILHARM
BY Michael J. Striker
his ATTORNEY United States Patent Office 3,460,889
Patented Aug. 12, 1969

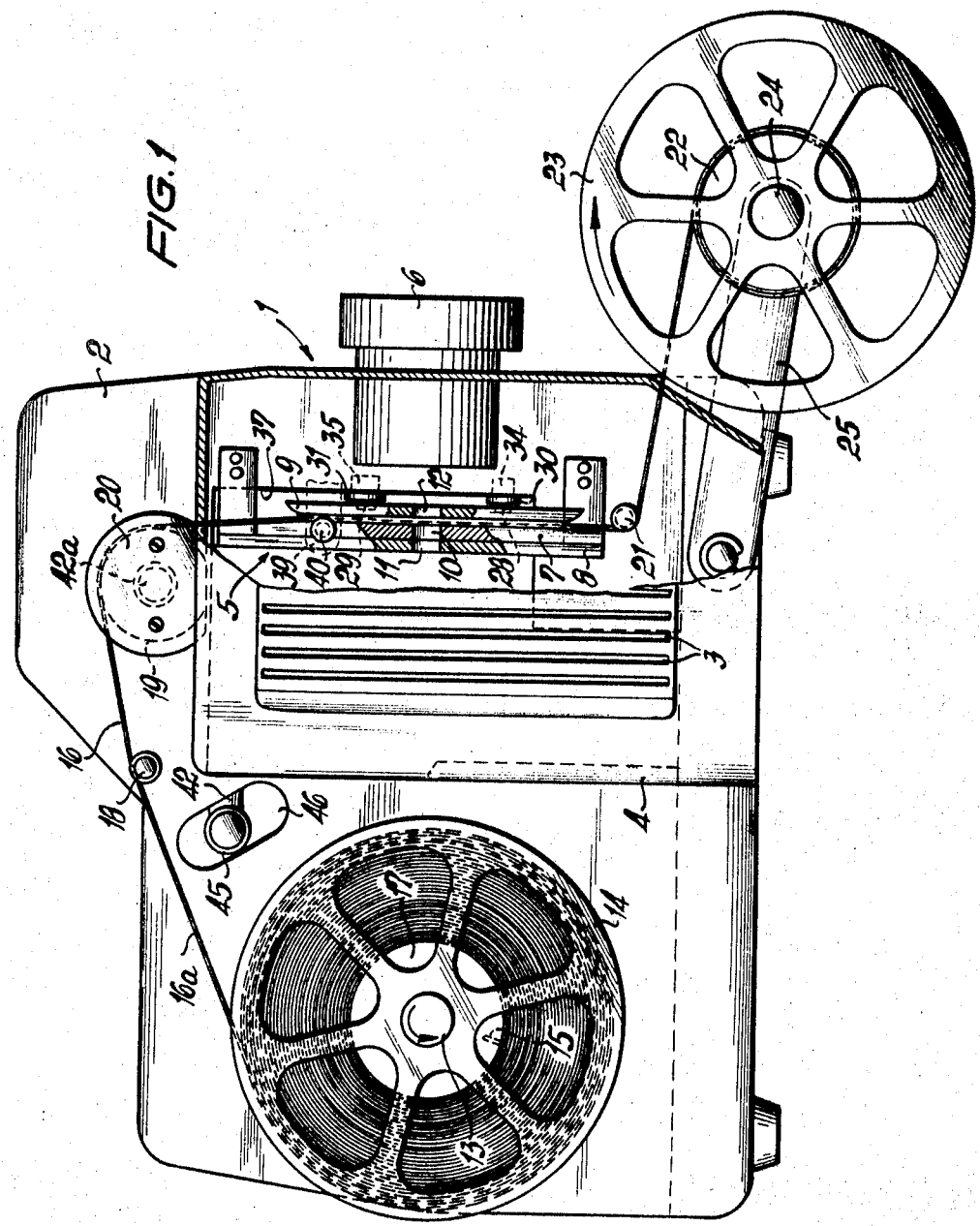

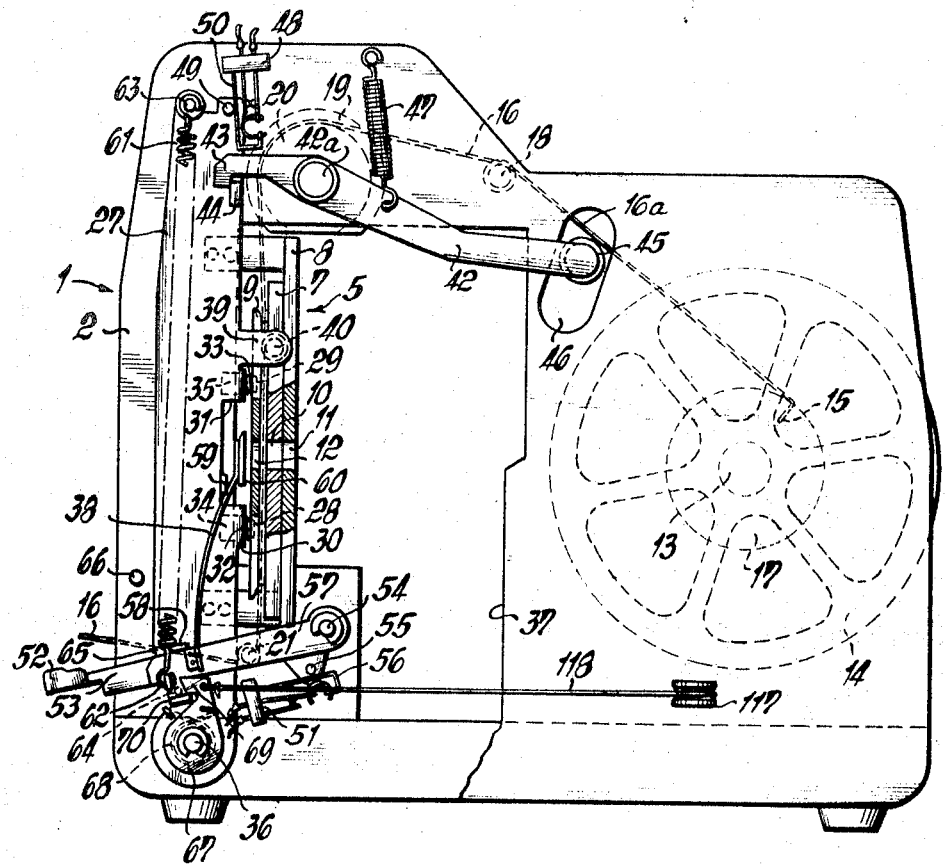

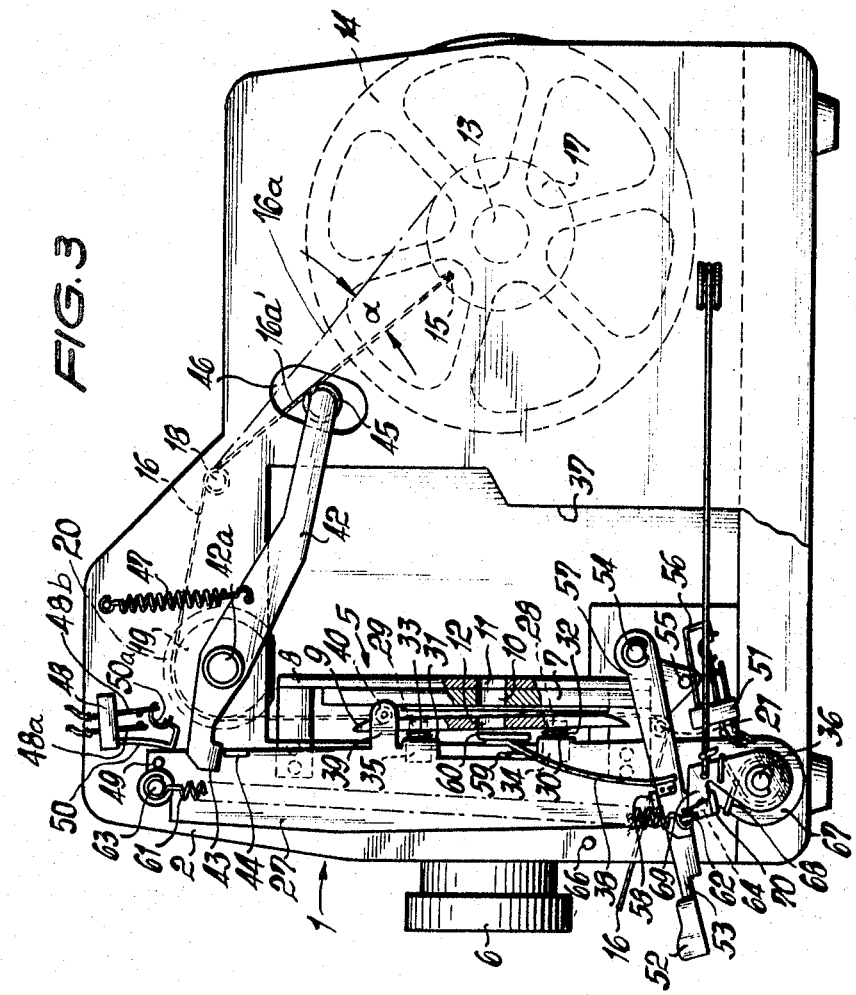

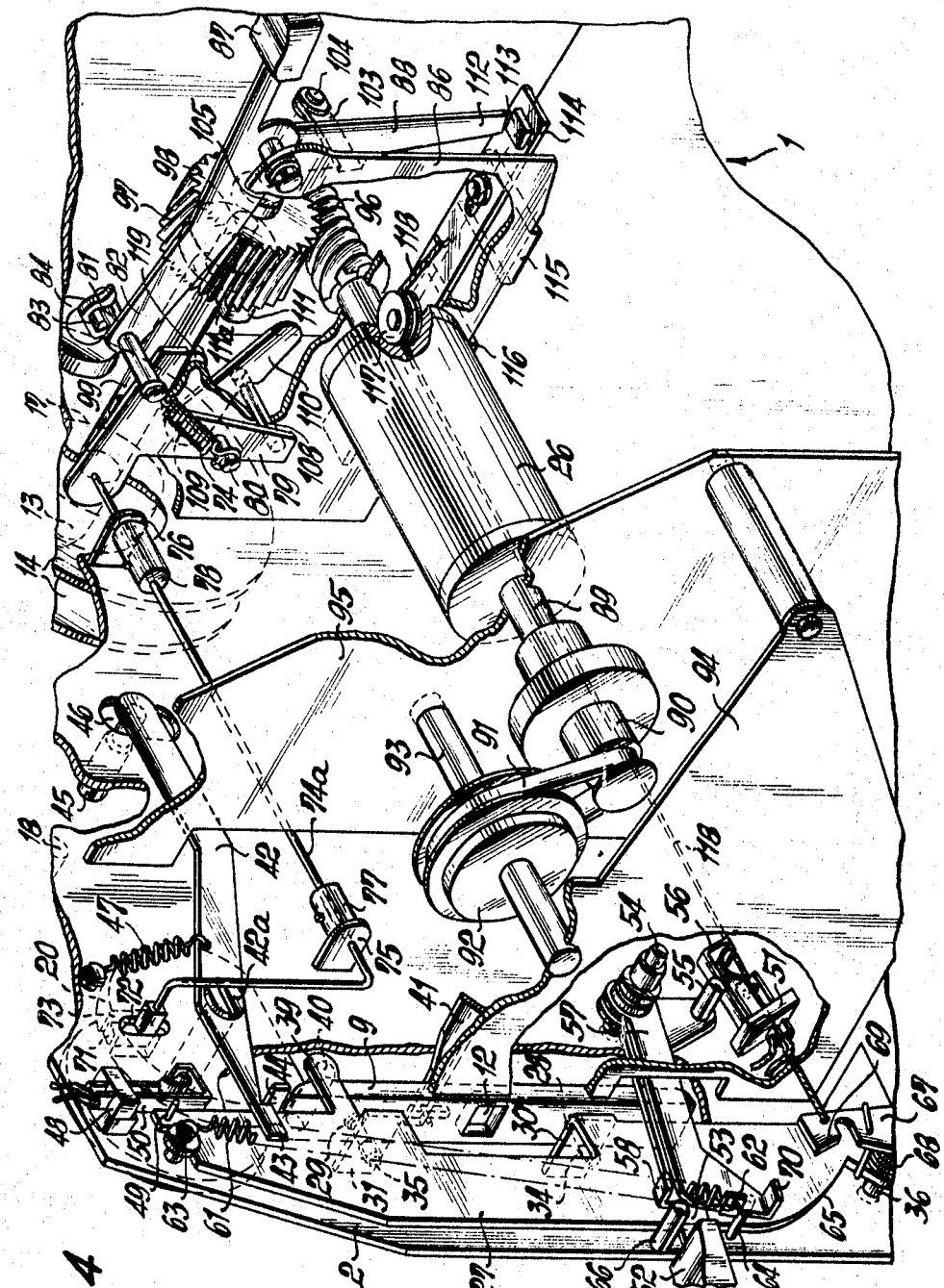

3,460,889
MOTION PICTURE PROJECTOR
Theo Wilharm, Endersbach, Germany, assignor to Robert Bosch Elektronik und Photokino G.m.b.H., Stuttgart-Unterturkheim, Germany
Filed Aug. 3, 1966, Ser. No. 569,886
Claims priority, application Germany, Aug. 10, 1965, B 83,213
Int. Cl. G03b 1/12
U.S. Cl. 352—124                            22 Claims

ABSTRACT OF THE DISCLOSURE

A motion picture projector wherein a detector arrests the motor of the film transporting mechanism in response to movement of the trailing end of film from a tangential to a radial position with reference to the core of the supply reel. When actuated by the film the detector may also automatically trigger the rewinding of the film. The detector is disengaged from the film when at least a portion of the film is convoluted on the core.

---

The present invention relates to motion picture projectors. More particularly, the invention relates to improvements in the construction and operation of such parts in a motion picture projector which can automatically arrest the film transporting mechanism when the projection of images is completed.

It is already known to provide a motion picture projector with a roller or an analogous device which is mounted on a rockable lever and to utilize the roller to trigger the rewinding operation in response to the last stroke of the claw pull-down. A serious drawback of such projectors is that the claw pull-down is likely to damage or to tear the film around the perforations when the motor is turned off or when the direction of film movement is reversed. It can also happen that the claw pull-down actually extracts the tip of the film from the core of the supply reel so that the aforementioned roller is ineffective during the next-following projection of images. When the film is damaged by the claw pull-down, the operator must separate the damaged part so that the claw pull-down will engage an intact portion of the film. Such work is time-consuming and requires considerable skill as well as intimate knowledge of the operation of the projector.

Accordingly, it is an important object of the present invention to provide a motion picture projector with novel control means which enables the film to automatically set the projector for rewinding in response to completed unwinding of film from the supply reel and wherein such change in the condition of the projector will take place without any damage to or undue stressing of the film.

Another object of the invention is to provide a motion picture projector wherein the film can automatically arrest the drive which rotates the takeup reel during operation in forward and wherein, if desired, the film can automatically trigger the operation in reverse so that the operator need not perform any manipulations whatever excepting to start the motor when the projection of images is to begin.

A further object of the invention is to provide a novel detector which may be used in the aforementioned control means to initiate various operations, not as a function of the operation of claw pull-down but solely in response to impulses received from the film.

An additional object of my invention is to provide a motion picture projector which can be manipulated by persons having little technical skill, whose operation can be readily explained to an unskilled person with little loss in time, and wherein the film gate automatically releases the film as soon as the operation in forward (i.e., the projection of images from the film which is being withdrawn from a supply reel) is terminated.

A concomitant object of the invention is to provide a novel film tracking unit which can be utilized in a motion picture projector of the above outlined characteristics.

Briefly stated, my invention resides in the provision of a motion picture projector which comprises a spindle or an analogous rotary member arranged to support the core of a supply reel for convoluted motion picture film one end of which is anchored in the core so that, in response to its unwinding, that portion of the film which forms the innermost convolution moves to a position in which it extends substantially or exactly radially with reference to the core (i.e., the film moves from a substantially tangential to a substantially radial position relative to the core when the last or innermost convolution is withdrawn from the supply reel so that only the tip of the film remains in contact with the core), operating means preferably including a film transporting mechanism (such as a claw pull-down) and motor means for the transporting mechanism to withdraw the film from the supply reel and to thereby rotate the core in a sense to pay out successive convolutions of the film which is simultaneously collected on the core of a customary takeup reel after having passed through a film gate located between the projection lamp and the projection lens, and control means for arresting the operating means or for rendering the operating means ineffective. In accordance with an important feature of my invention, the control means comprises a roller or an analogous detector which is responsive to movement of the film from the aforementioned tangential to radial position and thereby inactivates the operating means. Such detector may be provided on a suitable retainer lever which is rockable on the housing of the projector and maintains the pressing plate of the film gate in film guiding position as long as the detector is not caused to rock the retaining lever in response to movement of the film from tangential to radial position with reference to the core of the supply reel.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawings, in which:

FIG. 1 is a somewhat schematic side elevational view of a motion picture projector which embodies one form of my invention, certain parts of the projector being shown in section;

FIG. 2 illustrates the other side of the projector, with the rear wall removed and with certain parts shown in section;

FIG. 3 illustrates the structure of FIG. 2 drawn to a somewhat larger scale, the detector of the projector being shown in a position it assumes when the film is fully withdrawn from but its trailing end still remains attached to the supply reel;

FIG. 4 is a fragmentary perspective view of the interior of the projector housing, the parts of the projector being illustrated in positions they assume when the projector is not in use;

FIG. 5 illustrates certain parts of the structure shown in FIG. 4 in the positions they assume during rewinding of film onto the supply reel; and FIG. 6 is an exploded perspective view of a clutch which can drive the spindle for the supply reel.

Referring first to FIG. 1, there is shown a motion picture projector which comprises a housing 1 having a side wall or main support 2 carrying a detachable casing 4. This casing 4 is formed with ventilating slots 3 and accommodates a conventional projection lamp (not shown), a film gate 5, and a portion of a projection lens 6. The film gate 5 comprises a backup plate 7 affixed to a stationary supporting element 8 and a spring-biased pressing plate 9 which is located in front of the backup plate 7. The pressing plate 9 is normally biased against the plate 7 to assume a film guiding position but can be moved forwardly and away in a manner to be fully described hereinafter and to then assume a releasing position. The parts 7, 8 and 9 are respectively provided with registering apertures 10, 11 and 12 located in planes normal to and traversed by the optical axis of the projection lens 6.

The rear portion of the side wall 2 carries a rotary member 13 here shown as a spindle which can be introduced into the core 17 of a supply reel or spool 14 containing a supply of convoluted motion picture film 16. The rearmost portion or tip 15 of the film 16 is anchored in a radially extending slot of the core 17 in a manner well known from the art of motion picture projectors so that it requires a certain force to separate the film from the supply reel. The film 16 is trained around a first guide roll or deflecting roll 18 which is mounted on the side wall 2 at a level above the casing 4, thereupon around the smaller-diameter central portion of a second guide roll or deflecting roll 20 and extends downwardly through the gap between the plates 7, 9, around a further guide roll or deflecting roll 21 and to the core 22 of a takeup reel or spool 23. The core 22 is slipped onto a second rotary member or spindle 24 which is mounted at the free end of an arm 25 articulately connected to the side wall 2. When the film 16 is being paid out by the supply reel 14 and is taken up by the reel 23, the spindle 24 is driven by an electric motor 26 (shown in FIG. 4) which is accommodated in the interior of the housing 1. The driving connection between the motor 26 and the spindle 24 comprises a pair of pulleys and an endless belt (not shown). In the position of the projector as shown in FIG. 1, the spindle 24 and reel 23 will be driven in a clockwise direction as indicated by the arrow.

The deflecting roll 20 is provided with a circumferential groove 19 into which the film 16 extends. The numeral 16a denotes in FIG. 1 that length of the film which constitutes the trailing end of the film that has been withdrawn from the supply reel 14. This length 16a extends tangentially of the outermost convolution on the core 17.

The pressing plate 9 is mounted on a rockable lever-shaped carrier 27 which is shown in FIGS. 2 to 4. The arrangement is such that the pressing plate 9 is movable substantially in the longitudinal direction of the optical axis of the projection lens 6. Two vertically spaced guide pins 28, 29 extend through bent-over portions or lugs 30, 31 of the carrier 27. The guide pins 28, 29 respectively pass through helical expansion springs 32, 33 which are disposed between the pressing plate 9 and the lugs 30, 31 so that the pressing plate is biased rearwardly and against the front face of the backup plate 7 when the carrier 27 assumes the operative position shown in FIG. 2. The carrier 27 assumes such operative position when the projector is operated in forward so that the film 16 is being drawn off from the supply reel 14 and is being convoluted on the core 22 of the takeup reel 23. The front end portions of the guide pins 28, 29 carry heads 34, 35 (see FIG. 3) which are located in front of the lugs 30, 31 and serve as stops to prevent detachment of the pressing plate 9 from the carrier 27. The heads 34, 35 (which may be constituted by nuts screwed onto externally threaded front end portions of the guide pins 28, 29) also limit the extent to which the pressing plate 9 is movable with reference to the carrier 27.

The lower end portion of the carrier 27 is fulcrumed on a horizontal pivot pin 36 which is carried by and is located at the inner side of the wall 2. The aforementioned lugs 30, 31 of the carrier 27 extend through a relatively large cutout 37 of the side wall 2, this cutout being shown in FIGS. 2 and 3. A leaf spring 38 bears against the carrier 27 and tends to move it to inoperative position shown in FIG. 3 in which the gap between the plates 7 and 9 is wide enough to allow for unimpeded passage of the film 16. In other words, and referring to FIG. 3, the leaf spring 38 tends to rock the carrier 27 in a counterclockwise direction. When the carrier 27 is free to follow the bias of the spring 38, the film gate 5 is held in open position. This carrier 27 further comprises an arm or extension 39 for a distancing roller 40 which is located behind the film 16 (i.e., the film runs between the roller 40 and the pressing plate 9). The roller 40 serves as a means for moving the film 16 away from the range of a film transporting mechanism which is operated by the motor 26 and preferably comprises a customary claw pull-down 41 a portion of which is illustrated in the perspective view of FIG. 4. Such movement of the film 16 will take place in response to movement of the carrier 27 to inoperative position, namely, in response to opening of the film gate 5. The roller 40 insures that the film 16 is held away from the claw-pull down 41 during rewinding onto the supply reel 14 so that the claw pull-down cannot enter the perforations 16c (see FIG. 5) and does not damage or destroy the film.

The inner side of the wall 2 (i.e., that side which faces away from the supply reel 14) is adjacent to a two-armed retaining lever 42 mounted on a pivot pin 42a carried by the wall 2. The function of the retaining lever 42 is to hold the carrier 27 in operative position when the projector is operated in forward and the pressing plate 9 bears against the film 16. The retaining lever 42 then opposes the bias of the leaf spring 38 which tends to move the carrier 27 to the inoperative position of FIG. 3. The front arm of the lever 42 is hooked, as at 43, so that it can engage and retain a bent-over lug 44 of the carrier 27. The rear arm of the lever 42 carries a detector or sensor in the form of a roll 45 which extends through a cutout or slot 46 of the side wall 2 and is adjacent to the normal path of the trailing portion 16a of the film 16. A relatively weak spring 47 tends to rock the lever 42 to the retaining position shown in FIG. 2, i.e., in a counter-clockwise direction.

A comparison of FIGS. 2 and 3 will show that the trailing end 16a of the film 16 is moved from a substantially tangential position (with reference to the core 17) to a substantially radial position when the last convolution of film is withdrawn from the supply reel 14 so that only the tip 15 remains attached to the core 17. The angle alpha (FIG. 3) shows the inclination of that trailing portion 16a which precedes the last convolution with reference to the trailing portion 16a' which immediately precedes the tip 15. Such change in the position of inclination of the film is sufficient to rock the retaining lever 42 through the intermediary of the detector roller 45 and to overcome the bias of the spring 47 whereby the hooked front arm 43 releases the lug 44 and the carrier 27 is free to move under the action of leaf spring 38 to assume the inoperative position shown in FIG. 3. The hook on the front arm 43 of the lever 42 is so short that it releases the carrier 27 even before the supply reel 14 comes to a standstill, i.e., while the innermost convolution of the film is being withdrawn from the core 17. This insures that the claw pull-down 41 cannot engage the film 16 when the latter is at a standstill because the aforementioned distancing or disengaging roller 40 moves the film away from the claw pull-down in immediate response to movement of the carrier 27 to the inoperative position of FIG. 3. As explained hereinbefore, engagement of the claw pull-down 41 with the film 16 while the latter is at a standstill could damage the film by tearing the material around the perforation 16c which is engaged by the claw pull-down.

While moving from the operative position of FIG. 2 to the inoperative position of FIG. 3, the carrier 27 automatically arrests the motor 26 by allowing opening of a toggle switch 48 which is connected in the circuit of the motor 26 and of the aforementioned projection lamp in the casing 4. The carrier 27 is provided with a trip in the form of a stud 49 which closes the switch 48 when the carrier moves to operative position. The stud 49 then bears against a resilient actuator 50 (see the top portions of FIGS. 2 and 3) which moves an arcuate conductor 50a against an electric contact 48a. The conductor 50a is connected with a second electric contact 48b.

The switch 48 is connected in series with a second toggle switch 51 which is shown adjacent to the pivot pin 36 for the carrier 27. This switch 51 will be closed following closing of the switch 48 by the carrier 27. The means for closing the switch 51 comprises a manually operated actuating lever or handle 53 provided with a handgrip portion or knob 52 which extends from the housing 1. The handle 53 is rockable on a pivot pin 54 extending from the inner side of the wall 2. A stud or trip 55 of the handle 53 engages a resilient actuator 56 which closes the switch 51 in automatic response to depression of the knob 52 and in the same way as described in connection with the resilient actuator 50 of the switch 48. The upper or non-depressed position of the handle 53 is illustrated in FIG. 4.

The pivot pin 54 further supports a restoring member 57 for the handle 53. This restoring member 57 also resembles a lever and is arranged to share each movement of the handle 53 to the lower end position of FIG. 2 or 3 but is not actually coupled to the handle so that the latter can be moved upwardly at any time during projection whereby the operator can arrest the film in an infinite number of intermediate positions before the film actually rocks the retaining lever 42. The function of the restoring member 57 is to automatically return the handle 53 to the upper end position of FIG. 4 when the projection of pictures is terminated, i.e., when the detector 45 is rocked by the trailing portion 16a'. In other words, the restoring member 57 can be said to constitute a means for opening or allowing opening of the toggle switch 51 through the intermediary of the handle 53. The latter has a bent-over motion transmitting portion or lug 58 which overlies the restoring member 57 and rocks the latter in a counter-clockwise direction, as viewed in FIG. 4, when the knob 52 is depressed by a finger. On the other hand, and when the restoring member 57 is rocked in a clockwise direction, as viewed in FIG. 2 or 3, it transmits motion to the handle 53 through the intermediary of the lug 58. The restoring member 57 supports the aforementioned leaf spring 38 for the carrier 27. This spring bears against a bentover portion or lug 59 of the carrier 27 and it also bears against a platen 60 of the housing 1 when the carrier 27 is held in operative position.

The restoring member 57 is biased by a relatively strong helical spring 61 whose upper end is attached to a stud 63 on the side wall 2. The lower end of the spring 61 is attached to a similar stud 62 on the restoring member 57. The latter is further provided with a pin-shaped follower 64 which tracks a cam face 65 of the carrier 27. This is best shown in the lower left-hand portion of FIG. 4. The spring 61 rocks the restoring member 57 upon completion of the rewinding operation whereby the restoring member 57 turns in a clockwise direction, as viewed in FIG. 3, and the handle 53 turns in the same direction into abutment with a fixed stop pin 66. The follower 64 then acts against the cam face 65 and returns the carrier 27 to operative position so that the film gate 5 closes again. In other words, movements of the carrier 27 to inoperative and back to operative position take place automatically upon completion of forward projection and upon completion of the rewinding operation.

The pivot pin 36 for the carrier 27 further supports a locking member 67 which cooperates with the restoring member 57 to hold the latter in the ineffective position during travel of the film 16 to the core 22 of the takeup reel 23. Such ineffective position of the restoring member 57 is shown in FIGS. 2 and 3 and corresponds to the lower end position of the handle 53. The locking member 67 then opposes the bias of the spring 61 which tends to rock the restoring member 57 in a clockwise direction. This locking member 67 is biased by a torsion spring 68 which tends to maintain it in the locking position in which its pallet 69 engages a bent-over lug 70 of the restoring member 57.

The projector further comprises a device for automatically disengaging the locking member 67 from the restoring member 57 upon completion of the rewinding operation. This device includes a tracking finger 71 which extends through a slot 72 in the side wall 2 and into a registering slot 73 provided in the deflecting roll 20, the slot 73 being in communication with the circumferential groove 19 so that the tracking finger 71 can engage the adjoining edge face of the film 16. During rewinding, the tracking finger 71 is biased by a spring 74 so that it then extends through the slots 72, 73 and engages the edge face of the film 16. This tracking finger can be called a signal generator because it initiates the disengagement of the locking member 67 from the restoring member 57 when the trailing end of the film 16 has moved past the groove 19 and toward the supply reel 14, i.e., when the entire film has been collected by the core 17.

The tracking finger 71 is mounted at one end of a suitably deformed wire-like holder 74a which is turnable in bearing brackets 75, 76 provided at the inner side of the wall 2, see particularly FIG. 4. Two cylinders 77, 78 are screwed to the holder 74a and respectively abut against the brackets 75, 76 to prevent axial movements of the holder.

The free end of the holder 74a is fixedly secured to a lever 79 which carries a stud 80 for one end of the aforementioned spring 74. The other end of the spring 74 is attached to a stud 81 on a further lever 82. The stud 81 extends into a forked trip 83 forming part of an electric switch 84 which is secured to the side wall 2. The switch 84 is connected in parallel with the aforementioned switches 48 and 51. The lever 82 is rockable on a pivot pin 85 which is carried by a partition 86 affixed to and extending at right angles to the side wall 2. This lever 82 also constitutes a manually operable actuating member or handle and is provided with a handgrip portion or knob 87. The latter is accessible from the outside of the housing 1. The handle 82 further comprises a downwardly extending third arm 88 which can transmit motion to the locking member 67 for the restoring member 57. The arm 88 can also change the position of a clutch which is installed in the power train between the electric motor 26 and the spindle 13 for the supply reel 14.

FIGS. 4 and 5 show that the electric motor 26 comprises an output shaft 89 one end of which carries a pulley 90 shown in FIG. 4. The latter drive an endless belt 91 which is trained around a pulley 92 whose shaft 93 rotates a customary shutter having a blade which moves into and from the path of light rays passing through the apertures 10–12 when the circuit of the motor 26 is completed. The shaft 93 also carries a motion transmitting cam (not shown) which operates the aforementioned claw pull-down 41. This shaft 93 is journalled in two bearing plates 94, 95 affixed to the side wall 2.

The other end of the output shaft 89 carries a coaxial worm 96 which meshes with a worm wheel 97. This worm wheel 97 is rotatable and is axially movable on the inner end portion 98 of the spindle 13 for the supply reel 14 (see also FIG. 6). The spindle 13 is rotatable in a bearing sleeve 99 provided therefor in the side wall 2. The inner end portion 98 of the spindle 13 carries a diametral pin 100 which may be engaged by two axially parallel pins 101, 102 of the worm wheel 97. The parts 97, 98 and 100 to 102 together constitute a clutch which can transmit motion from the worm 96 to the spindle 13 when the worm wheel 97 is moved axially toward and onto the end portion 98, reference being had to FIG. 6.

The means for engaging this clutch includes a pusher 104 resembling a pin and mounted on a bentover lug 103 of the third arm 88 of the handle 82. The pusher 104 can bear against a disk 105. The axial bore 106 of the worm wheel 97 accommodates a clutch spring 107 which bears against the end face of the end portion 98 and against the disk 105. If the knob 87 is depressed to rock the handle 82 from the end position of FIG. 4 to that shown in FIG. 5, the stud 81 on the handle 82 changes the position of the trip 83 to close the switch 84 and to thus complete the circuit of the motor 26. It is to be recalled that the switch 84 is connected in parallel with the switches 48 and 51. At the same time, the arm 88 of the handle 82 moves the pusher 104 against the disk 105 (which is fixed to the worm wheel 97) so that the pusher 104 overcomes the bias of the spring 107 and moves the pins 101, 102 into engagement with the pin 100 whereby the spindle 13 begins to rotate and drives the supply reel 14 in a direction to withdraw the film 16 from the take-up reel 23. The reel 14 rotates in a counterclockwise direction, as viewed in FIG. 1, and the film 16 is automatically withdrawn from the reel 23. The switch 84 comprises a spring (not shown) which can maintain the trip 83 in two end positions and is strong enough to oppose the bias of the springs 74 and 107. Thus, the clutch 97, 98, 100–102 remains engaged and the tracking finger 71 bears against the edge face of the film 16 in the groove 19.

The lever 79 on the holder 74a for the tracking finger 71 is provided with a pin 108 serving to rock a disengaging lever 110 mounted on a pivot pin 109 provided on the partition 86. The disengaging lever 110 tends to rock in a clockwise direction (as viewed in FIG. 5) under the action of gravity and can cooperate with the inclined face 111a of a cam 111 on the worm wheel 97. The cam 111 is provided on that end face of the worm wheel 97 which is turned toward the lever 79. Upon completion of the rewinding operation, i.e., when the spring 74 is free to move the tracking finger 71 into the groove 19 of the deflecting roll 20 because the trailing end of the film 16 has moved beyond the roll 20 and on toward the supply reel 14, the lever 79 causes its pin 108 to shift the disengaging lever 110 into the path of the cam 111. As the tip of the lever 110 engages the cam face 111a, the worm wheel 97 yields and moves axially to disengage its pins 101, 102 from the diametral pin 100 of the spindle 13. This disengages the aforementioned clutch so that the supply reel 14 ceases to rotate. At the same time, the worm wheel 97 causes its disk 105 to return the handle 82 to its initial position (shown in FIG. 4) so that the stud 81 moves the trip 83 and opens the switch 84. This brings the motor 26 to a standstill.

The lower end portion 112 of the arm 88 on the handle 82 constitutes a motion transmitting element which can snap behind a projection 113 (see FIG. 5) provided on a resilient rail 114. This rail has elongated slots for pins secured to a pair of horizontal lugs 115, 116 forming part of the partition 86 so that the rail 114 can reciprocate with reference to the housing 1. A cord 118 has one of its ends anchored in the rail 114 and is trained around a fixed pulley 117. The other end of the cord 118 is attached to the pallet 69 of the locking member 67. When the clutch 97, 98, 100–102 is disengaged by the lever 110, the motion transmitting element 112 of the handle 82 engages the projection 113 of the rail 114 and moves the latter in a direction to the right, as viewed in FIG. 5. Such movement is transmitted to the locking member 67 through the intermediary of the cord 118 whereby the pallet 69 releases the restoring member 57.

The operation of the improved motion picture projector is as follows:

FIG. 4 illustrates the film gate 5 in closed position. The lug 43 of the retaining lever 42 engages the lug 44 of the carrier 27 against the action of the leaf spring 38. The trip 49 of the carrier 27 maintains the switch 48 in closed position. The handle 53 is held in the upper end position in which it abuts against the stop pin 66 so that the trip 55 allows the resilient actuator 56 to maintain the switch 51 in open position. The handle 82 also assumes its upper end position so that the switch 84 is open. The clutch 97, 98, 100–102 is disengaged and the lever 79 is biased by the spring 74 so that it abuts against the stud 81 of the handle 82. Therefore, the tracking finger 71 is withdrawn from the groove 19 of the deflecting roll 20. The disengaging lever 110 rests on the pin 108 of the lever 79 and its tip is located outside of the path of the face 111a on the cam 111. This cam is connected to or forms part of the worm wheel 97.

The operator then attaches a fresh supply reel 14 by slipping the core 17 onto the spindle 13. The operator also slips the core 22 of an empty takeup reel 23 onto the spindle 24. The film 16 is then threaded into the projector in a manner as described in connection with FIG. 1, and the leading end of the film is attached to the core 22 of the takeup reel 23. As shown in FIG. 1, the film 16 is then trained around the guide rolls 18, 20, 21 and passes between the plates 7 and 9. The projector is now ready for forward operation which begins when the operator depresses the handle 53 by exerting finger pressure against the knob 52. The handle 53 then moves from the upper end position of FIG. 4 to the lower end position of FIG. 2 or 3. Its lug 58 entrains the restoring member 57 which causes the spring 61 to store energy. The locking member 67 is ready to engage and to retain the restoring member 57 in its lower end position. The trip 55 of the handle 53 closes the switch 51 so that the circuit of the motor 26 is completed. The switch 51 (together wth the switch 48) also completes the circuit of the aforementioned projection lamp which is mounted in the casing 4 so that the lamp sends a beam of light through the registering apertures 10–12 and through that film frame which happens to be located between the plates 7 and 9. The motor 26 operates the claw pull-down 41 through the intermediary of the shaft 93 whereby the claw pull-down advances the film 16 in stepwise fashion. The spindle 13 for the supply reel 14 is not driven but the motor 26 drives the spindle 24 through a suitable friction clutch (not shown) so that the reel 23 takes up the film and convolutes it on the core 22. The reel 23 rotates in a clockwise direction, as viewed in FIG. 1.

If he wishes to interrupt the projection of images, the operator simply returns the handle 53 to the upper end position, i.e., into abutment with the stop pin 66. This opens the switch 51 so that the motor 26 is arrested and the circuit of the projection lamp is open. The restoring member 57 remains in the position of FIG. 2 or 3 because it is held by the locking member 67. As explained hereinabove, the restoring member 57 is only compelled to share movements of the handle 53 to the lower end position but the handle 53 is free to rock independently of the restoring member when the latter is locked by the member 67.

When the last convolution of the film 16 is withdrawn from the core 17 of the supply reel 14, the trailing end 16a' (see FIG. 3) rocks the detector 45 so that the retaining lever 42 turns in a clockwise direction and releases the carrier 27. The leaf spring 38 then rocks the carrier 27 in a counterclockwise direction, as viewed in FIG. 2, so that the pressing plate 9 moves away from the backup plate 7 and ceases to clamp and guide the film 16. The trip 49 of the carrier 27 allows the resilient actuators 50 to open the switch 48 so that the motor 26 comes to a halt. The distancing roller 40 moves the film 16 away from the claw pull-down 41 simultaneously with movement of the carrier 27 to inoperative position.

In order to rewind the film 16 onto the core 17 of the supply reel 14, the operator will exert finger pressure upon the knob 87 of the handle 82. This rocks the handle 82 in a clockwise direction, as viewed in FIG. 4, so that the handle 82 ultimately assumes the lower end position shown in FIG. 5. During such movement of the handle 82, its arm 88 causes the pusher 104 to move the worm wheel 97 axially against the opposition of the clutch spring 107 so that the clutch 97, 98, 100–102 is engaged and the spindle 13 is ready to rotate as soon as the motor 26 is started. The stud 81 changes the position of the trip 83 so that the switch 84 is closed and the motor 26 begins to rotate and drives the spindle 13 in a counterclockwise direction, as viewed in FIG. 1. The lever 79 abuts against the stud 81 and is biased by the spring 74 so that the tracking finger 71 enters the slots 72, 73 and bears against the adjoining edge face of the film 16 in the groove 19. The relatively weak spring 74 causes the tip of the finger 71 to bear against the film 16 with a small force. Such position of the tracking finger 71 is shown in FIG. 5. The motion transmitting element 112 of the arm 88 on the handle 82 has moved past and has snapped behind the projection 113 of the resilient rail 114. The handle 82 then remains in such depressed position under the bias of the aforementioned spring in the switch 84 which can hold the trip 83 in either of its two end positions.

When the trailing end of the film 16 has been withdrawn from the core 22 of the takeup reel 23, it moves past the tracking finger 71 so that the latter is free to penetrate deeper into the groove 19 of the deflecting roll 20. Such movement of the tracking finger 71 (under the bias of the spring 74) causes the lever 79 to turn in a counterclockwise direction, as viewed in FIG. 5, and to raise its pin 108 sufficiently to place the tip of the disengaging lever 110 into the path of the face 111a on the cam 111 of the worm wheel 97. Movement of the lever 79 under the action of the spring 74 is terminated when it abuts against the stud 81 of the handle 82. The lever 110 disengages the clutch 97, 98, 100–102 so that the spindle 13 is disconnected from the motor 26. The extent of upward movement of this lever 110 is determined by a fixed stop pin 119 (see FIG. 5) and the arrangement is such that the face 111a engages the tip of the lever 110 from below so that it causes the lever to bear against the pin 119.

As the lever 110 causes the worm wheel 97 to move axially of the spindle 13, the disk 105 of the worm wheel automatically returns the handle 82 to the upper end position through the intermediary of the pusher 104 on the arm 88. Such upper end position of the handle 82 is shown in FIG. 4. The handle 82 causes its stud 81 to open the switch 84 through the trip 83 so that the motor 26 is arrested. Also, the motion transmitting element 112 at the lower end of the arm 88 shifts the rail 114 so that the cord 118 disengages the locking member 67 from the restoring member 57 whereby the latter follows the bias of the spring 61 and moves the handle 53 back to the upper end position, namely, against the stop pin 66. During such upward movement of the restoring member 57, its follower 64 engages the cam face 65 on the carrier 27 and returns the latter to operative position in which the hooked front arm 43 of the retaining lever 42 engages the lug 44. This closes the film gate 5. The lever 42 is biased by its spring 47 and remains in retaining position until the detector 45 is again rocked by the trailing film portion 16a'. The trip 49 of the carrier 27 bears against the resilient actuator 50 and closes the switch 48. However, the motor 26 cannot run because the switch 48 is connected in series with the switch 51 which is open because the handle 53 has reassumed its upper end position.

It will be seen that, in the embodiment of FIGS. 1 to 6, the forward and reverse operations of the projector are triggered by the handles 53 and 82, respectively. However, it is equally within the purview of my invention to omit the knob 87 altogether and to automatically start the projector in reverse as soon as the last convolution of the film 16 is withdrawn from the core 17 of the supply reel 14. This can be achieved by utilizing the movement of the carrier 27 to inoperative position for transmitting motion through a suitable linkage or the like so that the clutch 97, 98, 100–102 is engaged as soon as the lever 42 releases the carrier 27. The just mentioned linkage then rocks the handle 82 to the position of FIG. 5 in order to start the rewinding operation. Of course, the handle 82 could also receive motion from another movable part which changes its position in response to rocking of the detector 45 by the film portion 16a'. For example, a linkage, an electromagnet, a cable or another motion transmitting device can move the handle 82 to the position of FIG. 5 in response to rocking of the retaining lever 42, in response to a change in the position of the leaf spring 38, in response to movement of the pressing plate 9 away from the backup plate 7, or in response to an impulse received directly from the detector 45.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a cinematographic apparatus, particularly in a motion picture projector, a rotary member arranged to support the core of a supply reel for convoluted motion picture film one end of which is anchored in the core so that, in response to its unwinding, that portion of the film which forms the innermost convolution moves to a position in which it extends substantially radially with reference to the core; operating means for withdrawing the film from said reel and for thereby rotating said core in a direction to pay out successive convolutions of the film; guide means for guiding the film which is being paid out by said core, said guide means being spaced from said rotary member; control means for inactivating said operating means, said control means including detector means responsive to movement of said film portion to radial position, said detector means being disposed between said guide means and said rotary member in such position that it is bypassed by film which is being paid out by said core and that it is engaged by said portion of the film when such portion extends substantially radially of said core.

2. A structure as set forth in claim 1, further comprising a film gate for the film, said gate being located downstream of said detector means as seen in the direction in which the film is being withdrawn from said reel and including a pressing member movable between film guiding and releasing positions, said control means comprising retaining means for holding said pressing member in said film guiding position, said retaining means being operatively connected with said detector means to release said pressing member in response to movement of said film portion to radial position.

3. A structure as set forth in claim 2, wherein said retaining means comprises a lever rockable about a fixed axis and further comprising resilient means for biasing said lever to holding position, said detector means comprising a sensor provided on said lever and arranged to rock the latter against the action of said resilient means in response to movement of said film portion to radial position.

4. A structure as set forth in claim 2, further comprising resilient means for biasing said pressing member against the film when the pressing member assumes said film guiding position.

5. A structure as set forth in claim 1, wherein said operating means comprises film transporting means, electric motor means for driving said transporting means, and switch means connected in circuit with said motor means, said control means further comprising means for opening said switch means to thereby arrest said motor means in response to movement of said film portion to radial position.

6. A structure as set forth in claim 5, further comprising a projection lamp connected in circuit with said switch means.

7. A structure as set forth in claim 1, wherein said operating means comprises film transporting means adapted to advance the film stepwise and to thus withdraw the film from said reel, and further comprising a film gate located downstream of said detector means as seen in the direction in which the film is advanced by said transporting means, said film gate comprising a pressing member movable between a film guiding and a releasing position, a carrier supportingly connected with said pressing member and movable between operative and inoperative positions respectively corresponding to the film guiding and releasing positions of said pressing member, means for effecting movement of said carrier to inoperative position through said detector means in response to movement of said film portion to radial position, and distancing means for moving the film away from said transporting means in response to movement of said film portion to radial position.

8. A structure as set forth in claim 7, wherein said distancing means is provided on and is movable with said carrier so that the film is moved out of the range of said transporting means in response to movement of said carrier to inoperative position.

9. A structure as set forth in claim 1, wherein said operating means comprises film transporting means for advancing the film stepwise in a direction to withdraw the film from the supply reel, electric motor means for driving said film transporting means, and switch means connected in circuit with said motor means, and further comprising manually operable actuating means movable from a first to a second position to thereby close said switch means.

10. A structure as set forth in claim 9, further comprising a film gate located downstream of said detector means as seen in the direction in which the film is advanced by said transporting means, said film gate comprising a pressing member movable between film guiding and releasing positions, and means for moving said pressing member to film guiding position in response to movement of said actuating means to second position.

11. A structure as set forth in claim 9, further comprising restoring means for automatically returning said actuating means to first position in response to completed rewinding of the film onto said supply reel.

12. A structure as set forth in claim 11 wherein said restoring means comprises a restoring member arranged to share the movement of said actuating means to second position and resilient means for biasing said restoring member in a direction to return said actuating means to first position.

13. A structure as set forth in claim 12, wherein said actuating means is a lever rocable about a fixed axis and said restoring member is a lever which is also rockable about said fixed axis.

14. A structure as set forth in claim 13, further comprising a film gate located downstream of said detector means as seen in the direction in which the film is advanced by said transporting means, said film gate comprising a pressing member movable between film guiding and releasing positions and resilient means provided on said restoring member for biasing said pressing member to releasing position.

15. A structure as set forth in claim 12, further comprising locking means for holding said restoring member in a position corresponding to the second position of said actuating means and tracking means for disengaging said locking means from said restoring member in response to completed rewinding of film onto said supply reel.

16. A structure as set forth in claim 15, wherein said tracking means comprises a tracking member movable into engagmeent with the film upstream of said supply reel when the film is being rewound onto said core, said tracking member being arranged to perform an additional movement when the trailing end of the film has advanced therebeyond and to thereby trigger the disengagement of said locking means from said restoring member.

17. A structure as set forth in claim 15, further comprising clutch means adapted to connect said motor means with said rotary member to drive the latter in a direction to wind the film onto said core, second actuating means for engaging said clutch means to thereby start rewinding of film onto said supply reel, and an operative connection between said clutch means and said tracking means for disengaging said clutch means in response to completed rewinding of film onto said supply reel, and motion transmitting means between said clutch means and said locking means for disengaging said locking means from said restoring member in response to disengagement of said clutch means.

18. A structure as set forth in claim 17, wherein said operative connection comprises a disengaging member movable by said tracking means into engagement with a component of said clutch means to terminate the driving connection between said motor means and said rotary member when the trailing end of the film has moved past said tracking means in response to completed rewinding of film onto said supply reel.

19. A structure as set forth in claim 17, wherein said second actuating means comprises a manually operable handle movable from a first to a second position to thereby engage said clutch means and comprising a motion transmitting portion for disengaging said locking means from said restoring member in response to movement from said second to said first position thereof.

20. A structure as set forth in claim 19, further comprising an operative connection between said motion transmitting portion of said handle and said locking means including a resilient member movable by said motion transmitting portion in response to movement of said handle to first position, and a flexible member connecting said resilient member with said locking means.

21. A structure as set forth in claim 19, wherein said handle comprises means for moving said tracking means away from the film in response to movement of said handle to first position.

22. In a motion picture projector, a rotary member arranged to support the core of a supply reel for convoluted motion picture film one end of which is anchored in the core so that, in response to its unwinding, that portion of the film which forms the innermost convolution moves to a position in which it extends substantially radially with reference to the core; operating means for withdrawing the film from said reel and for thereby rotating said core in a direction to pay out successive convolutions of the film, said operating means comprising film transporting means for advancing the film stepwise in a direction to withdraw the film from the supply reel, electric motor means for driving said film transporting means, and switch means connected in circuit with said motor means; manually operable actuating means movable from a first to a second position to thereby close said switch means; control means for inactivating said operating means, said control means including detector means responsive to movement of said film portion to radial position; a film gate located downstream of said detector means as seen in the direction in which the film is advanced by said transporting means, said film gate comprising a pressing member movable between film guiding and releasing positions; means for moving said pressing member to film guiding position in response to movement of said actuating means to second position; restoring means for automatically returning said actuating means to first position in response to completed rewinding of the film onto said supply reel, said restoring means comprising a restoring member arranged to share the movement of said actuating means to second position and resilient means for biasing said restoring member in a direction to return said actuating means to first position; locking means for holding said restoring member in a position corresponding to the second position of said actuating means; tracking means for disengaging said locking means from said restoring member in response to completed rewinding of film onto said supply reel; clutch means adapted to connect said motor means with said rotary member to drive the latter in a direction to wind the film onto said core; second actuating means for engaging said clutch means to thereby start rewinding of film onto said supply reel; an operative connection between said clutch means and said tracking means for disengaging said clutch means in response to completed rewinding of film onto said supply reel, said operative connection comprising a disengaging member movable by said tracking means into engagement with a component of said clutch means to terminate the driving connection between said motor means and said rotary member when the trailing end of the film has moved past said tracking means in response to completed rewinding of film onto said supply reel, said component of said clutch means constituting a cam; and motion transmitting means between said clutch means and said locking means for disengaging said locking means from said restoring member in response to disengagement of said clutch means.

References Cited

UNITED STATES PATENTS 3,240,550  3/1966  Mitchell et al. _____ 352—124

JULIA E. COINER, Primary Examiner